Patented Jan. 2, 1923.

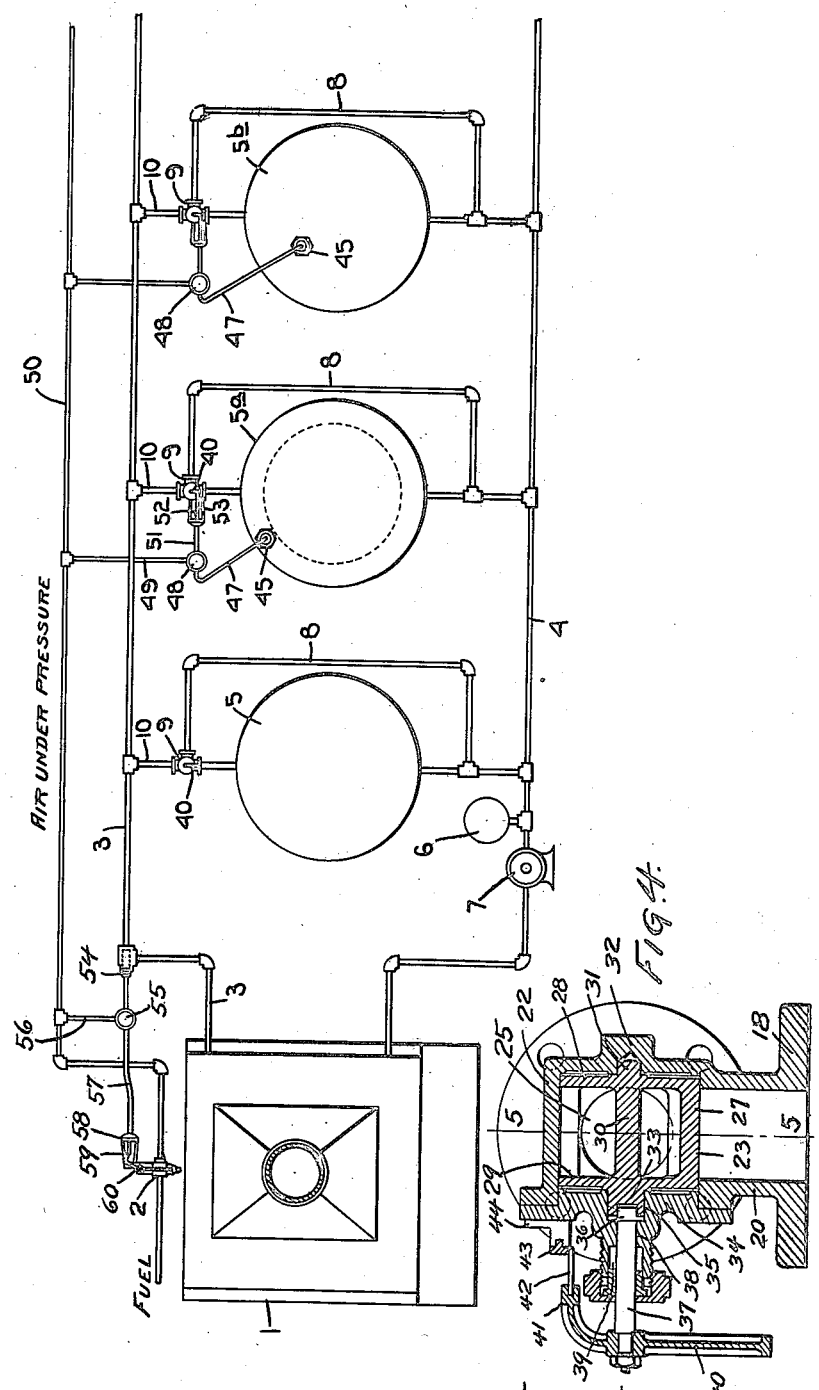

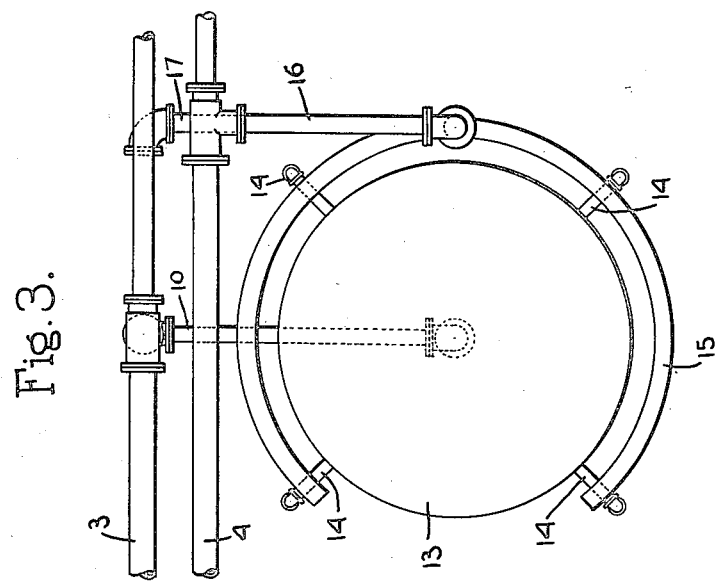
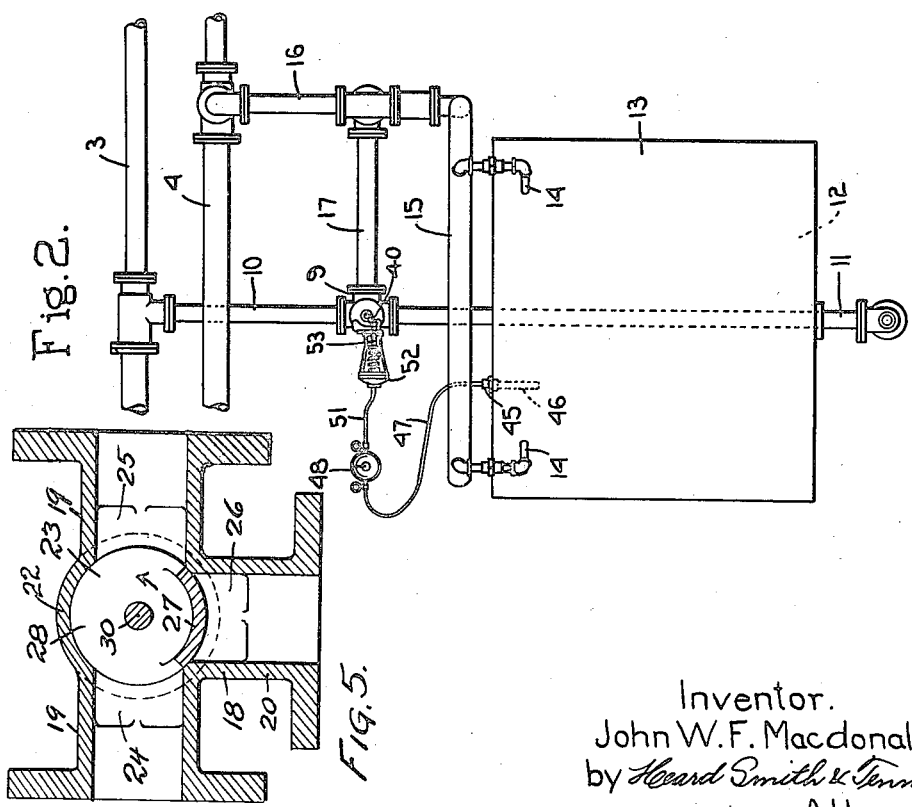

1,440,926

UNITED STATES PATENT OFFICE.

JOHN W. F. MACDONALD, OF BOSTON, MASSACHUSETTS, ASSIGNOR TO THE MERRILL PROCESS COMPANY, OF BOSTON, MASSACHUSETTS, A CORPORATION OF MASSACHUSETTS.

THERMIC APPARATUS.

Application filed May 22, 1919. Serial No. 298,868.

*To all whom it may concern:*

Be it known that I, JOHN W. F. MACDONALD, a citizen of the United States, residing at Boston, county of Suffolk, State of Massachusetts, have invented an Improvement in Thermic Apparatus, of which the following description, in connection with the accompanying drawing, is a specification, like characters on the drawing representing like parts.

This invention relates to improvements in thermal apparatus in which a traveling fluid medium is employed for transporting heat from a suitable source to a transferring device or plurality of transferring devices by which the heat thus transported is utilized to accomplish a predetermined result.

The term "thermic" or "thermal apparatus" is used herein as designating an apparatus capable of generating and distributing heat to a heat utilizer through the instrumentality of a circulating heat carrying or transporting medium, or for absorbing or rejecting heat from said circulating heat transporting medium for the purpose of removing the heat from the heat utilizing means.

The principal object of the invention is to provide means for correlating the amount of heat supplied to, or abstracted from, one or more heat transferring or utilizing devices by a continuously circulating heat transporting medium, to the demands of the heat utilizing or transferring device or devices.

A further object of the invention is to provide means for correlating the amount of heat supplied to or abstracted from a system containing a plurality of heat transferring devices, to the demands of the system where one or more of the heat transferring devices is provided with means for correlating the amount of heat supplied to its particular demand.

The invention is illustrated herein as applied to the general type of apparatus disclosed in my prior Patents Nos. 1,278,067 and 1,278,068, granted Sept. 3, 1918, and application No. 265,386, filed Dec. 5, 1918, and Patent No. 1,287,071, granted to Willis C. Merrill Dec. 10th, 1918, in all of which a traveling body of viscous liquid passes through a heater and is carried around or through a heat transferring or utilizing means which is heated or cooled by conduction from the circulating heat transporting fluid. It will, therefore, be understood that the present invention comprehends regulating means for apparatus adapted either to supply heat to or abstract heat from the transferring or heat utilizing means.

Various means have been disclosed in the patents above mentioned and elsewhere for controlling the temperature of the fluid medium leaving the heater by regulation of the fuel supplied to the heater furnace, which is preferably liquid or gaseous, or for regulating the velocity of the flow of the heat transporting medium thereby controlling the amount of heat delivered to one or more of the heat transferring or utilizing devices. When, however, it is desired to supply heat to a variety of heat utilizers, each of which may have entirely different demands for heat, all such means are inadequate to regulate either the temperature or the amount of heat supplied to each of the individual heat utilizing units. Furthermore, whatever the aggregate demand of the several heat utilizers, means such as above cannot correlate the fuel supply to either the individual or aggregate heat demands of the utilizers, unless such means are controllable.

My invention contemplates providing means for correlating the heat supplied to each heat transferrer or utilizing means in accordance with its demand and for correlating the aggregate supply of heat to the utilizing units to their aggregate demand. By the present invention I am able to correlate the heat input into the system at the heater to the aggregate demand of the utilizing means by subjecting a thermostat to the temperature of the fluid leaving the heater and automatically controlling the supply of fuel to the heater furnace by said thermostat. The correlation of the heat supplied to the demands of the individual heat transferrers or heat utilizing units is accomplished by providing means for by-passing more or less of the heat transporting fluid around the transferrer or heat utilizing means so that only a sufficient amount will be introduced into the transferrer to supply the heat demanded by the same. The beneficial result of such an arrangement is clear since no fuel will be wasted in supplying heat which cannot be utilized and the system may be rendered practically automatic so far as heat and temperature regulation is concerned, thereby avoiding the necessity for great skill or judgment upon the part of the operator in treating materials which have to be subjected in their treatment either to constant or variable heat conditions.

The use of this invention is especially advantageous in connection with industrial apparatus in which the heat is supplied from a circulating fluid or medium heated to a predetermined temperature dependent upon the nature of the process carried on in the apparatus. Apparatus in which the conditions described above exist include melting or saturating tanks in which compounds are raised to temperatures suitable for the successful saturation of fabrics, roofing felt and the like and in which it is important that the temperature be maintained constant against losses due to radiation from the exposed surfaces of the apparatus or the compound itself and against the losses of heat incidental to the evaporation of moisture in fabric or other material being saturated, which is often passed through saturating tanks in a continuous sheet.

Similar cases arise in the chemical industries in connection with the heating of chemical compounds in jacketed kettles or the like and in connection with the heating of materials to which heat is applied both prior to and during the process of distillation. In the latter case the rate at which heat is demanded prior to distillation may be smaller than during distillation for the reason that the conductive properties of the materials in the still may be relatively low, therefore permitting them to absorb heat at a relatively low rate until distillation actually commences when, due to exchange of latent heat and to the ebullition of the material and consequent high velocity over the heating surface, the absorption of heat takes place at a much more rapid rate. In such cases as this it is very important that means shall be provided for regulating the heat input in such a way that when the distillation stage is reached the heat input may be quickly increased to a predetermined rate greater than that maintained prior to distillation. It is also important that means shall be provided, when a plurality of heating units is employed, for independently regulating the heat input for each unit, without affecting the heat input of any other unit. This is accomplished in the present invention by providing a three-way valve in the branch conduit leading to each of the heat transferring or utilizing units, the valve being so constructed as to permit a constant flow of the heat transporting material at all times, but adapted to divert any proportional part of the material through a by-pass around the heat utilizing means when said material is not required to maintain the desired temperature in said heat utilizing means. The by-pass valves desirably are all thermostatically actuated by the temperature of the contents of their respective heat transferrers or utilizers, or by the temperature of the fluid leaving the heat utilizers. The valves will thus be compelled to by-pass all of the heat transporting fluid except that which is required to maintain the desired condition.

The temperature of the fluid in the return main to the heater will, of course, be lower than that in the supply main by an amount which is proportionate to the aggregate heat delivered to the heat utilizers since the flow of fluid is constant. If the aggregate heat input increases, the temperature of the returning fluid will increase and will tend to raise the temperature of the fluid leaving the heater. Where, however, a thermostat for controlling the fuel supply is located in the outgoing main conduit a slight increase in the temperature of the fluid leaving the heater will cause the fuel controlling thermostat to cut down the supply of fuel and diminish the heat of combustion until the heat input equals the aggregate demand. Conversely, if the aggregate demand increases the temperature of the returning fluid is lowered, tending to lower the temperature of the fluid leaving the heater, which will cause the fuel controlling thermostat to increase the fuel supply and the heat of combustion by the construction above described. The amount of heat delivered to each transferring or utilizing device is correlated to its demand and the heat input of the entire system is also correlated to the aggregate heat demand by this method.

A preferred embodiment of the invention, which is adapted to accomplish the results above specified, is illustrated in the accompanying drawings in which, Fig. 1 is a diagramatic illustration of a heating apparatus by which heat is transferred from a suitable source of heat to a series of heat utilizing units, means being provided for automatically controlling the amount of heat delivered to each of said heat utilizing units in correlation to the demands of the unit, means also being provided for controlling the aggregate amount of heat supplied to the heater.

Fig. 2 is a side elevation of one of the heat transferring or utilizing units and of the means through which the heat transporting fluid is delivered to it, Fig. 3 is a plan view of the same, Fig. 4 is a vertical transverse sectional view of the preferred form of three-way valve and valve casing for controlling the heat transferring medium, Fig. 5 is a vertical sectional view on line 5—5 Fig. 4.

As illustrated in the drawing a furnace 1 of any suitable type may be employed, which preferably may be supplied with heat by a liquid fuel burner 2, such as that illustrated in my prior application No. 255,537, filed September 24, 1918. The transporting medium, which desirably is a hydrocarbon having a high carbonizing point, is contained and circulated in a conduit which passes in a sinuous course through the furnace 1 and has an outgoing member 3 leading from said furnace, and a returning member 4 connecting with the section of the conduit within the furnace. A constant and positive circulation of heat transporting medium is maintained by a suitable pump 7 which preferably is located in the return member 4 of the main conduit and acts upon the cooler liquid from which heat has been delivered to the heat transferring means.

In order to provide for replenishing the supply of fluid and also in order to prevent increase in pressure upon the fluid due to the heating of the same, an expansion chamber 6 is provided which leads to the return branch 4 of the main conduit upon the intake side of the pump.

Any number of heat transferring devices 5, 5ª, and 5ᵇ, may be suitably arranged between the outgoing member 3 and the returning member 4 of the conduit within the capacity of the apparatus.

It is obvious that in order to maintain a predetermined temperature in each of the heat transferring or utilizing units it is necessary that the heat transporting medium, which leaves the furnace, shall be maintained at a considerably higher temperature than that which is required by the several heat utilizing means, and that where variations in the demands of heat by the heat utilizing means occur, it is necessary in order to maintain the desired temperature either to vary the temperature of the transporting medium or to vary the amount of heat transporting medium supplied to the heat transferring or utilizing means to suit the conditions which are present.

In the present apparatus the regulation of the amount of heat delivered to the heat transferring or utilizing units is accomplished by varying the amount of heat transporting fluid which is passed through the respective units while the heat transporting fluid in the main conduit is also subject to regulation of temperature in order that the aggregate heat input may be varied in accordance with the demands of the system without unnecessary wastage of heat. If the regulation of the amount of heat delivered to each of the heat utilizing units the flow of heat transporting fluid is controlled by an ordinary valve, the restriction of the flow though one of the branches leading from the outgoing member of the conduit to the returning member of the conduit will cause a greater amount to flow through the other units of the system and will improperly vary their temperature.

In order to prevent this condition means are provided in the present invention whereby a constant flow of the heat transporting medium through the branch conduits may at all times be maintained, and such portions of the heat transporting fluid diverted through a by-pass around the heat transferring or utilizing unit as will permit just enough of the heat transporting fluid to be furnished to the heat transferring or utilizing unit to maintain the desired temperature therein.

In the present embodiment of the invention this is accomplished by providing by-passes 8 around each of the heat transferring or utilizing means, and employing a three-way valve 9 in each of the branches 10 leading from the outgoing member 3 of the main conduit through the respective heat utilizing means 5, 5ª and 5ᵇ to the returning member 4 of said conduit, the valve 9 being so constructed that it will divert through the by-pass 8 any proportional amount of the heat transporting fluid passing into the branch conduits 10, respectively, which is not required for the maintenance of the proper temperature in the respective heat utilizing units.

In the specific embodiment of the invention disclosed in Figs. 2 and 3 the branch conduit 10, which may connect with a by-pass through a three-way valve, has an upwardly extending portion 11 which enters the bottom of a jacket 12 of a suitable kettle 13. The fluid thus introduced after circulating around the kettle is discharged through a plurality of outlets 14 located at the upper portion of the jacket into a pipe 15 from which it is carried through a pipe 16 to the returning member 4 of the main conduit. If the valve 9 is so positioned as to permit a free flow through the branch conduit 10 the heat transporting fluid passes freely through the conduit to the kettle and thence to the return branch of the main conduit, thereby supplying a maximum amount of heat to the heat transferring or utilizing unit. When the amount of heat thus supplied would be in excess of the amount of heat demanded by the heat transferring or utilizing unit it is necessary to restrict the flow of the heat transporting medium sufficiently to cause just the right amount to be delivered to the heat transferring or utilizing means to maintain the desired temperature therein. In order to provide means for diverting a portion of the heat transporting fluid, without interfering with the volume circulated in the system or the pressure under which it is circulated, a by-pass corresponding to the by-pass 8 illustrated in Fig. 1 is provided. This by-pass consists of a pipe 17 leading from the three-way valve 9 to the branch 16 which delivers the fluid flowing from the jacket to the return member 4 of the main conduit.

The three-way valve 9 is adapted selectively to permit all of the fluid introduced into it to flow directly through the valve or to divert a part of it through the by-pass without restricting the flow of the material introduced into the valve.

A preferred three-way valve construction which is illustrated in Figs. 4 and 5 comprises a usual T-shaped valve casing 18 having a cylindrical main conduit 19 and a branch conduit 20, preferably at right angles thereto. The ends of these conduits may be provided with flanges 21 by which suitable union may be made with the pipes of the conduit, or any other suitable union may be provided.

The valve casing has a transverse cylindrical portion 22 in which a valve 23 is rotatably mounted. The portions of the main and branch conduits of the valve adjacent the transverse cylindrical portion of the valve chamber 22 may be and preferably are cut away so as to present ports 24, 25 and 26 of substantially rectangular form communicating with the cylindrical valve chamber. The valve 23 comprises a gate 27, the effective surface of which is a portion of a cylinder of approximate diameter equal to the diameter of the valve chamber 22. The gate 27 preferably is formed with integral disk-like heads 28, 29, which may also be connected by a central axis 30 having an extension 31 adapted to journal in a boss 32 in the casing. At its opposite ends the axis 30 may be provided with another extension 33 adapted to be journalled in a cap 34 enclosing the opposite end of the valve chamber. The extension 33 is provided with a recess 35 which receives the squared head 36 of the valve stem 37 which is journalled in a suitable bearing 38 in the cap 34 with a packing gland 39, preferably being provided to prevent leakage along the valve stem. A suitable valve operating lever 40 is rigidly connected to the valve stem 37 and desirably has a curved extension 41 provided with an index which may be in the form of a resilient latch 42 engaging at its end a notched sector 43 carried by a bracket 44 connected to the cap or to the valve casing. This sector may be graduated in such a manner as to indicate the extent to which the valve is opened, and the latch 42 may serve to retain the valve in position when once set where the valve is operated by hand.

The gate 27 of the valve swings about an axis coincident with the axis of the cylindrical valve chamber 22 and the width of the gate is such as to extend from the edge of one port entirely across said port and beyond it to the edge of the next adjacent port, so that as the gate is swung one port is opened at exactly the same rate and to the same extent that the other port is closed by the movement of the gate. By reason of this construction there is substantially no obstruction to the passage of the fluid through the valve chamber. When the gate 27 is in its normal position, as shown in Fig. 6, the entire supply of fluid will pass from the branch conduit 10 through the ports 24 and 25 to the jacket of the heat utilizing means, thereby supplying a maximum amount of heat to the latter. If the gate be moved slightly in the direction of the arrow a certain amount of material will be prevented from passing through the port 25 but the port 26 will be opened a corresponding amount, thus diverting a portion of the fluid through the by-pass. The open area of the port 26 will correspond exactly to the decrease in area of the port 25 so that the sum of the combined openings of the ports 25 and 26 will always be the same, regardless of whether one of the two outlet ports are entirely closed and the other wholly open, or whether the valve gate be at intermediate position.

By using this valve two advantages are procured. In the first place, the circulation of the heat transporting fluid is continued without interruption and without sensible change in the resistance to its flow, regardless of whether all of the fluid passes through the heat utilizing unit or is partly or wholly by-passed around it so that a predetermined amount of heat may be delivered to the heat utilizing unit without requiring changes in the velocity of the circulating medium or of the heat input. In the second place, it permits the use of automatic means for correlating the amount of heat introduced into the entire system to the aggregate demand of the heat utilizing units since the three-way valves afford no sensible obstruction to the free flow of the heat transporting fluid.

The valves may be adjusted manually and the segment 43 may desirably be provided with graduations, which in co-operation with the indicator 42 will indicate to the operator the extent to which the valve is open, so that he will be able to accurately gauge the amount of heat delivered to the heat utilizing unit. In Fig. 1 of the drawing the valve 9 of the conduit leading to the heat utilizing unit 5, which is the first of a series, is illustrated as a hand operated valve, while the valves 9 leading to the other heat utilizing units 5ᵃ and 5ᵇ are shown as automatically operated. The automatic operation of these valves may be accomplished through thermostatic means 45 which may be located either in the jacket of the heat utilizing member, as illustrated in connection with the heat utilizing unit 5ᵇ, or within the material contained in the heat utilizing member, as is illustrated in connection with the heat utilizing device 5<sup>b</sup>, or in the outgoing conduit leading from the heat utilizing member to the return conduit.

A convenient form of thermostatic regulator comprises a thermostatic capillary tube 46 which has an extension 47 leading to a diaphragm motor 48 which controls a valve in a branch 49 of a pipe 50 containing air under pressure, the opening or closing of the valve serving to supply or shut off the supply of air to a pipe 51 leading to a diaphragm motor 52, the plunger 53 of which is connected to the handle 40 of the three-way valve. Thus each of the heat utilizing units may be automatically controlled, for if the temperature in a unit rises beyond the predetermined amount the expansion of the fluid in the thermostatic bulb will operate the diaphragm motor 48 to open the valve leading to the pipe 51, thereby permitting the air under pressure to enter the diaphragm motor 52 and operate the plunger 53 to shift the handle 40 of the three-way valve in such a manner as to divert a portion of the heat transporting fluid through the by-pass 8. The amount to which the valve 40 will thus be opened automatically will depend upon the action of the thermostat. Conversely when the temperature in the heat utilizing unit falls below the predetermined amount the contraction of the expansible medium in the tube 46, 47 will close the valve leading from the pipe 49 to the pipe 51 and will permit the spring 54 of the motor to actuate the plunger 53 in the opposite direction, thus moving the handle 40 of the three-way valve in a direction to permit a greater flow of heat transporting fluid through the branch 10 to the jacket of the heat utilizing means.

Where in a system of this character a plurality of heat utilizing units are employed, which have different heat demands or are independently subject to variation in heat demands, it is desirable that automatic means may be employed for correlating the heat input to the aggregate demand of the system. This is accomplished in the present invention by placing a thermostatic device, such as a bulb and capillary tube 54, in the supply member 3 of the main conduit, said device serving to operate a regulator 55 controlling a valve leading from a branch 56 of the pipe 50 which contains air under pressure to a pipe 57 leading to a diaphragm motor 58 whose plunger 59 is connected to the handle 60 of the fuel burner 2. The heat transporting fluid is supplied to the expansion tank 6 from which it is delivered by gravity to the return branch 4 of the main conduit and is forced through the section in the furnace by the pump 7 which maintains a constant circulation at a constant velocity throughout the outgoing supply main 3 and the branch conduits 10 to the return conduit 4.

The by-pass valves operating as above described may all be thermostatically actuated by the temperature of their respective heat utilizers and will by-pass all of the fluid except that which is required to maintain the predetermined temperatures in the respective heat utilizing units.

In the operation of the system the temperature of the heat transporting fluid in the return main will be lower than that in the outgoing or supply main by an amount which is substantially proportional to the aggregate heat absorbed by the heat utilizers of the system. If the heat supplying means does not supply a sufficient amount of heat to meet the demands of the system the thermostatic device in the outgoing main will be operated to supply additional fuel to the burner. If on the other hand the amount of heat supplied to the heat transporting fluid is in excess of that demanded by the heat utilizers of the system the therstat in the outgoing main will be operated to cut down the supply of fuel. By the automatic, thermostatic regulation of the amount of heat transporting fluid delivered to the heat utilizers and the automatic thermostatic regulation of the aggregate amount of heat delivered to the system the greatest possible economy in the use of fuel is attained and a system provided which requires practically no attendance after the proper adjustment of the thermostats has been made.

It will be understood that the term "heat supplying means" is used in a broad sense as meaning not only a device for raising the temperature of the heat transporting liquid, but also in the sense of abstracting the heat from the heat transporting liquid.

It will be understood that the embodiment of the invention disclosed herein is of an illustrative character and not restrictive and that various modifications in construction, function and arrangement of parts may be made within the spirit and scope of the following claims.

Having fully described my invention what I claim as new and desire to secure by Letters Patent is:

1. A heating apparatus comprising a conduit system, means for maintaining a continuous forced circulation of a heat transporting liquid in said system, means for supplying heat to said liquid, a plurality of heat transferring means subject to said heat transporting liquid and means for correlating the amount of heat supplied to the respective heat transferring means to its demands without materially modifying the circulation of the heat transporting liquid or the heat transported to other heat transferring means.

2. A heating apparatus comprising a conduit system, means for maintaining a continuous forced circulation of a heat transporting liquid in said system, means for supplying heat to said liquid, a plurality of heat transferring means subject to said heat transporting liquid, means for correlating the amount of heat supplied to the respective heat transferring means to its demands without materially modifying the circulation of the heat transporting liquid or the heat transported to other heat transferring means and means for correlating the amount of heat supplied by the heat supplying means to the heat transporting liquid to the aggregate demand of all the heat transferring means of the system.

3. In a heating apparatus comprising a heat supplying means, a main conduit in circuit therewith having outgoing and returning members, a branch conduit connecting said outgoing and returning members, a heat utilizing means in said branch conduit, a by-pass in said branch conduit around said heat utilizing means, means for maintaining a forced circulation of a heat transporting liquid in said main conduit at a constant volume and pressure, and means for diverting a portion of the heat transporting liquid through said by-pass without varying the volume or velocity of the liquid delivered from and returned to the heating means.

4. A heating apparatus comprising a heat supplying means, a main conduit in circuit with said heat supplying means having outgoing and returning members, a plurality of branch conduits connecting said outgoing and returning members, heat utilizing means in said branch conduits, a by-pass in one of said branch conduits around its heat utilizing means, means for maintaining a constant forced circulation of a heat transporting liquid in said main conduit, and a valve in said by-pass operable to divert a portion of the heat transporting liquid through said by-pass without varying the volume or velocity of the liquid delivered from and returned to the heat supplying means.

5. In a heating apparatus comprising a heat supplying means, a main conduit in circuit therewith having outgoing and returning members, a plurality of branch conduits connecting said outgoing and returning members, a heat utilizing means in each branch conduit, a by-pass in each branch conduit leading around its heat utilizing means, means for maintaining a forced circulation of a heat transporting liquid at a constant volume and pressure in said main and branch conduits, valves in each branch conduit operable to divert a portion of said heat transporting liquid from its heat utilizing means through its by-pass without varying the volume or velocity of the liquid delivered from and returned to said heat supplying means and thermostatic means for controlling the respective valves each operable by variations in temperature of the heat utilizing means in the branch conduit containing the valve.

6. In a heating apparatus comprising a heat supplying means, a main conduit in circuit therewith having outgoing and returning members, a plurality of branch conduits connecting said outgoing and returning members, a heat utilizing means in each branch conduit, a by-pass in each branch conduit leading around its heat utilizing means, means for maintaining a forced circulation of a heat transporting liquid at a constant volume and pressure in said main and branch conduits, valves in each branch conduit operable to divert a portion of said heat transporting liquid from its heat utilizing means through its by-pass without varying the volume or velocity of the liquid delivered from and returned to said heat supplying means, thermostatic means for controlling the respective valves each operable by variations in temperature of the heat utilizing means in the branch conduit containing the valve, and thermostatic means subject to the temperature of the heat transporting liquid and means operable thereby to regulate the amount of heat generated by said heat supplying means whereby the amount of heat supplied to the heat transporting liquid will be correlated to the aggregate demands of said heat utilizing means.

In testimony whereof, I have signed my name to this specification.

JOHN W. F. MACDONALD.